US012789929B2

(12) United States Patent
Peng

(10) Patent No.: US 12,789,929 B2
(45) Date of Patent: Nov. 10, 2026

(54) SHOCK-ABSORBING SEATPOST

(71) Applicant: PRO GYM DESIGNS CO., LTD., Hsinchu City (TW)

(72) Inventor: Jing Yuan Peng, Taichung City (TW)

(73) Assignee: PRO GYM DESIGNS CO., LTD., Hsinchu City (TW)

(*) Notice: Subject to any disclaimer, the term of this patent is extended or adjusted under 35 U.S.C. 154(b) by 46 days.

(21) Appl. No.: 18/953,144

(22) Filed: Nov. 20, 2024

(65) Prior Publication Data

US 2026/0138694 A1 May 21, 2026

(51) Int. Cl.
*B62J 1/06* (2006.01)

(52) U.S. Cl.
CPC .................................... *B62J 1/065* (2013.01)

(58) Field of Classification Search
CPC ............... B62J 1/065; B62J 1/08; F16F 15/08
See application file for complete search history.

(56) References Cited

U.S. PATENT DOCUMENTS 6,409,130 B1 * 6/2002 Maret ...................... B62J 1/065
248/219.2
9,950,760 B2 * 4/2018 Ahnert ...................... B62J 1/04
12,522,309 B2 * 1/2026 Lee ........................... B62J 1/04
2019/0300084 A1 * 10/2019 Ahnert .................. F16F 15/067
2024/0278863 A1 * 8/2024 Wu ........................... B62J 1/06
2026/0062080 A1 * 3/2026 Feng ......................... B62J 1/08

FOREIGN PATENT DOCUMENTS

CN 2714413 Y * 8/2005 .............. B62J 1/065
DE 202025104853 U1 * 9/2025 ................ B62J 1/08

* cited by examiner

*Primary Examiner* — David R Dunn

(57) ABSTRACT

The present invention provides a shock-absorbing seatpost comprising a linkage mechanism and a resilient assembly. The linkage mechanism includes connecting joints at four corners which define a variable-sized accommodation chamber. The resilient assembly consists of two interlocking arcuate resilient members each having a first curved end and a second curved end, with an inwardly curved surface and an outwardly curved surface extending therebetween. The first curved end of one arcuate resilient member interlocks with the inwardly curved surface of the other to form an interlocking configuration within the accommodation chamber. A retention mechanism is disposed between the arcuate resilient members and the accommodation chamber, preventing disengagement and maintaining stability within the chamber.

8 Claims, 4 Drawing Sheets

SHOCK-ABSORBING SEATPOST

FIELD OF INVENTION

The present invention relates to a shock-absorbing structure. More particularly, it discloses an innovative configuration for a shock-absorbing seatpost.

BACKGROUND OF THE INVENTION

Conventional bicycle saddles often suffer from excessive rigidity and insufficient shock absorption, resulting in rider discomfort during use. To address these problems, the industry has developed various types of shock-absorbing seatposts to improve rider comfort by reducing vibration and shock.

While there are many different types of shock-absorbing seatposts currently available, practical experience has identified a number of persistent issues that require improvement and innovation. For instance, riders with different body types exert different levels of pressure on bicycle saddles, but conventional shock-absorbing seatpost structures are typically designed to handle compressive loads within a certain weight range and therefore lack structural adaptability. As a result, when a rider's weight falls outside of this range, inadequate or excessive shock absorption becomes particularly noticeable. In addition, the resilient components in conventional shock-absorbing seatposts are generally designed as individual modules. In the event of damage, the entire module must be replaced, as individual damaged components cannot be replaced separately, resulting in relatively higher maintenance costs.

SUMMARY OF THE INVENTION

The main purpose of the present invention is to provide a shock-absorbing seatpost, which aims to address the technical issue of how to develop an innovative shock-absorbing seatpost structure that enhances practical utility.

Based on the aforementioned purpose, the present invention provides the shock-absorbing seatpost comprising a linkage mechanism and a resilient assembly. The linkage mechanism includes connecting joints positioned at four corners and defines a variable-sized accommodation chamber. The resilient assembly includes two interlocking arcuate resilient members each having a first curved end and a second curved end, with an inwardly curved surface and an outwardly curved surface extending therebetween. The first curved end of one arcuate resilient member interlocks with the inwardly curved surface of the other arcuate resilient member to form an interlocking configuration, with the two interlocking arcuate resilient members being secured together within the accommodation chamber. Further, a retention mechanism is disposed between the two arcuate resilient members and the accommodation chamber to prevent the two arcuate resilient members from disengaging from their accommodated state within the accommodation chamber.

Through this structural configuration and innovative technical features, the present invention achieves superior shock-absorbing performance compared to conventional designs by utilizing the partial interlocking friction, mutual compression interaction, and elastic recovery mechanisms between the two arcuate resilient members. In addition, since the two arcuate resilient members are designed as separate components, they can be replaced individually in the event of damage, thereby reducing maintenance costs.

The partial frictional contact between the two arcuate resilient members also contributes to increased individual flexibility and longer service life. Moreover, by incorporating the arcuate resilient members of different material densities, the present invention facilitates customizable graduated shock absorption, thereby demonstrating enhanced practical utility and improved industrial applicability.

A further purpose of the present invention is achieved by an additional technical feature wherein multiple shock-absorbing slots are formed in each arcuate resilient member, said slots extending through both the inwardly curved surface and the outwardly curved surface thereof. During compression and deformation of the arcuate resilient members, these slots facilitate increased directional displacement capabilities with the deforming structures of the arcuate resilient members, thereby enhancing the elastic effect and resulting in improved ride comfort.

Yet another purpose of the present invention is achieved by an additional technical feature wherein an engagement recess is formed on the inwardly curved surface of one arcuate resilient member corresponding to a complementary engagement protrusion formed on the first curved end of the other arcuate resilient member. This structural configuration strengthens the interlocking engagement between the two arcuate resilient members, thereby effectively preventing their disengagement from the accommodation chamber, consequently reducing the risk of damage and ensuring operational safety.

An additional purpose of the present invention is realized by an additional technical feature wherein a compression flange partially protrudes from the second curved end of one arcuate resilient member, said compression flange being configured to press against the outwardly curved surface of the other arcuate resilient member, thereby providing a mutual compression effect and enhanced practical utility.

DETAILED DESCRIPTION OF THE PREFERRED EMBODIMENTS

Figure 1:
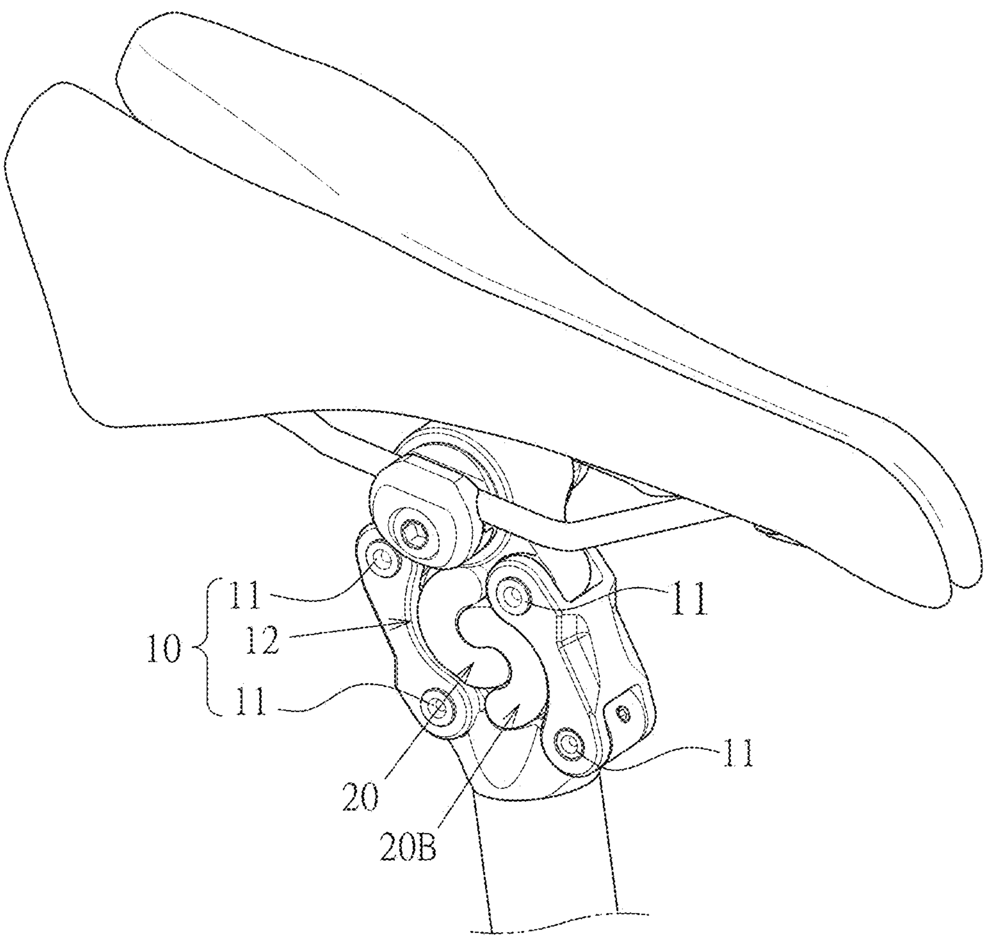
FIG. 1 is an assembled perspective view of a preferred embodiment of the present invention.

Refer to FIGS. 1 through 5, which illustrate a preferred embodiment of the shock-absorbing seatpost of the present invention. This embodiment is provided for illustrative purposes only and is not intended to limit the scope of the patent application.

The shock-absorbing seatpost comprises a linkage mechanism 10 and a resilient assembly (number omitted). The linkage mechanism 10 includes connecting joints 11 positioned at four corners thereof and defines a variable-sized accommodation chamber 12. The resilient assembly consists of two interlocking arcuate resilient members 20 and 20B, each arcuate resilient member 20 or 20B having a first curved end 21 and a second curved end 22, with an inwardly curved surface 23 and an outwardly curved surface 24 extending therebetween. The first curved end 21 of one arcuate resilient member 20 interlocks with the inwardly curved surface 23 of the other arcuate resilient member 20B to form an interlocking configuration, with the two interlocking arcuate resilient members 20, 20B being secured together within the accommodation chamber 12. Further, a retention mechanism 30 is disposed between the two arcuate resilient members 20, 20B and the accommodation chamber 12, the retention mechanism being configured to prevent the arcuate resilient members 20, 20B from disengaging from their accommodated position within the accommodation chamber 12.

Figure 2:
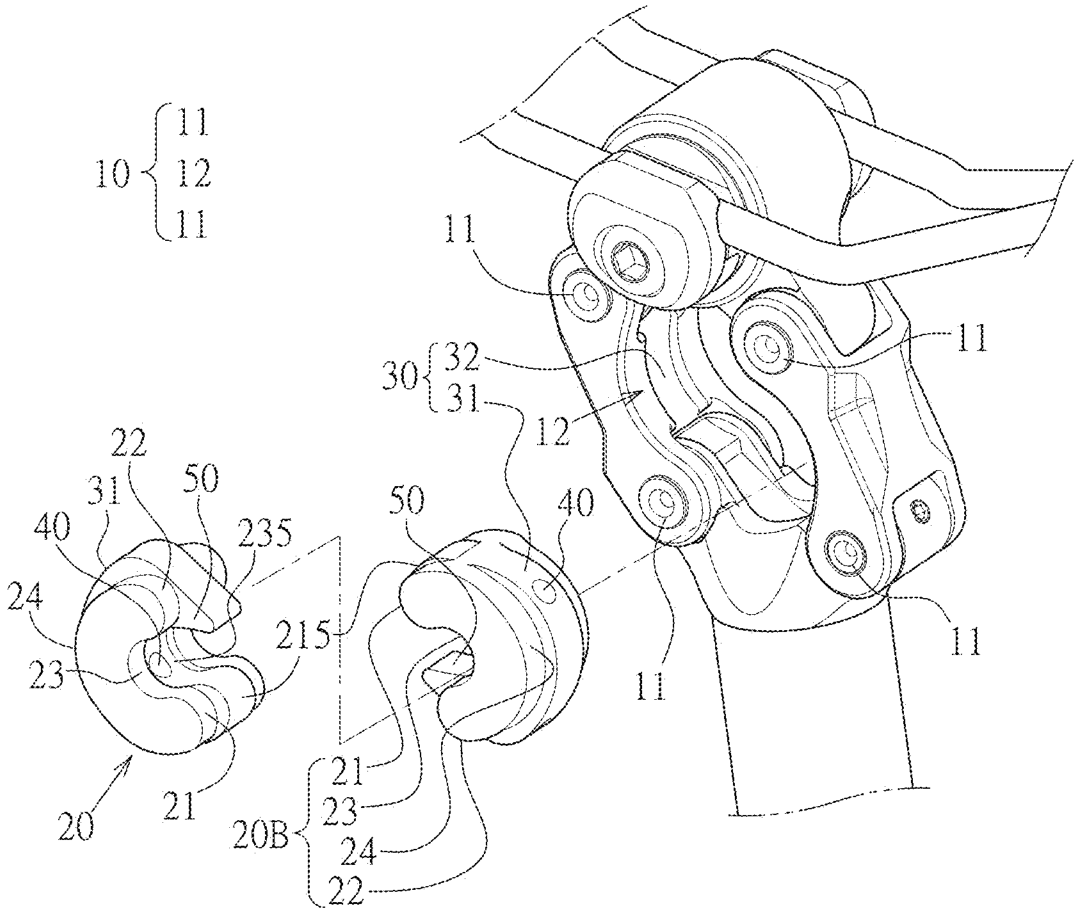
FIG. 2 is a partially exploded perspective view of the preferred embodiment of the present invention.
Figure 3:
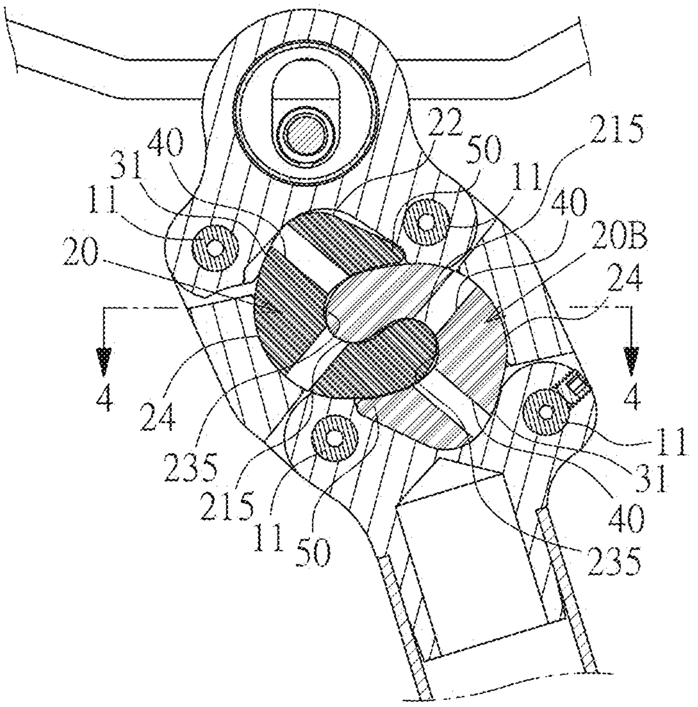
FIG. 3 is a sectional assembly view of the preferred embodiment of the present invention.

As shown in FIGS. 2 and 3, in this embodiment, each arcuate resilient member 20 or 20B further forms at least one shock-absorbing slot 40 extending through both the inwardly curved surface 23 and the outwardly curved surface 24, wherein the shock-absorbing slot may alternatively be configured as a groove. The advantage of the shock-absorbing slots 40 provided in the present embodiment are configured primarily to facilitate increased directional displacement capabilities of the arcuate resilient members 20, 20B during compression and deformation thereof, thereby enabling the arcuate resilient members 20, 20B to provide an enhanced elastic effect and consequently improved riding comfort.

Figure 4:
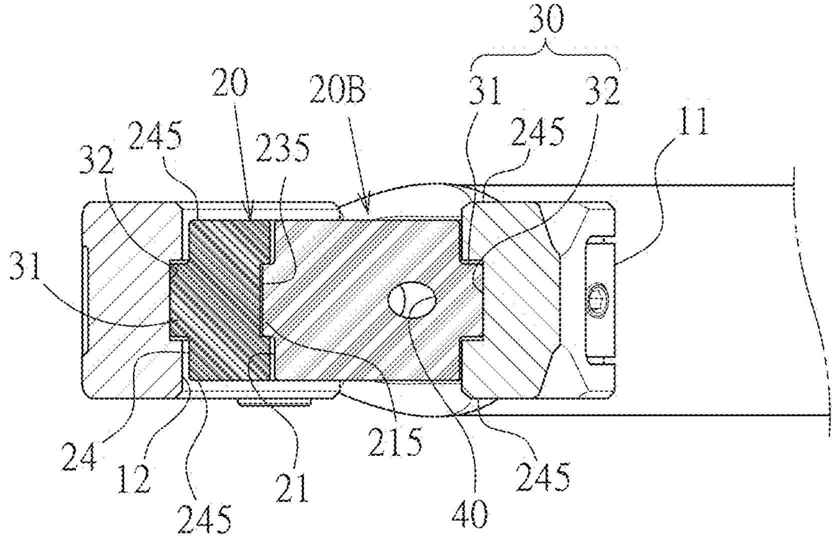
FIG. 4 is a sectional view taken along line 4-4 of FIG. 3.

As shown in FIGS. 2 and 4, in this embodiment, the inwardly curved surface 23 of the arcuate resilient member 20 further includes an engagement recess 235 corresponding to a complementary engagement protrusion 215 formed on the first curved end 21 of the other arcuate resilient member 20B. The engagement recess 235 and the engagement protrusion 215 are aligned with the position of the shock-absorbing slot 40 (as shown in FIG. 3). During compression and deformation of the arcuate resilient members 20, 20B, the engagement protrusion 215 is configured to compress into the shock-absorbing slot 40, thereby facilitating enhanced elastic flexibility and increased shock-absorbing performance. In the present embodiment, the engagement recess 235 and the engagement protrusion 215 are configured to strengthen the interlocking engagement between the two arcuate resilient members 20, 20B, thereby effectively preventing their disengagement from the accommodation chamber 12, consequently reducing the risk of damage and ensuring operational safety.

As shown in FIG. 4, in this embodiment, the retention mechanism 30 includes interlocking flanges 31 and grooves 32, wherein the flange 31 is formed on the outwardly curved surface 24 and extends to the second curved end 22, and wherein the groove 32 is formed at a corresponding position within the accommodation chamber 12. In the present embodiment, the outwardly curved surface 24 defines two lateral margins 245, with the flange 31 disposed in the middle partial section between the two lateral margins 245.

As shown in FIG. 2, in this embodiment, the second curved end 22 of one arcuate resilient member 20 further partially protrudes to form a compression flange 50 which presses against the outwardly curved surface 24 of the other arcuate resilient member 20B (In the present embodiment, both arcuate resilient members 20 and 20B have the compression flanges 50 which provide a mutual compressive effect).

Figure 5:
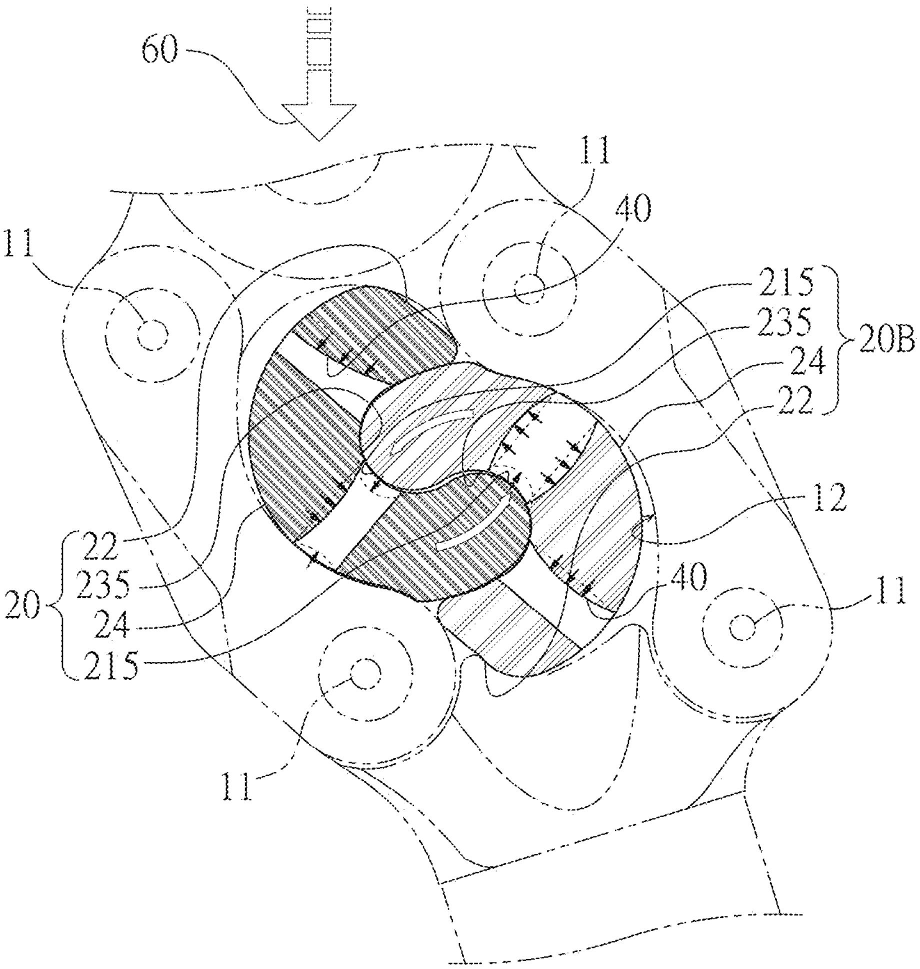
FIG. 5 is an operational state diagram of the preferred embodiment of the present invention showing shock-absorbing action.

By virtue of the above structural configuration and technical features, the shock-absorbing seatpost disclosed in the present invention is typically used beneath a bicycle saddle, as shown in FIG. 1. During operation, as shown in FIG. 5, when a user sits on the bicycle saddle and exerts an axial load 60, the connecting joints 11 adjust within their parallel quadrilateral linkage configuration, transforming the accommodation chamber 12 into a flattened, twisted state. At this time, the two interlocking arcuate resilient members 20 and 20B within the accommodation chamber 12 individually undergo unidirectional compressive deformation and, being made of elastic materials, the two arcuate resilient members 20 and 20B can accumulate elastic recovery force after compression, thereby achieving a shock-absorbing effect and enhancing rider comfort. In addition, the two arcuate resilient members 20 and 20B can further improve the shock absorbing effect through the partial friction, mutual compression, and elastic recovery mechanisms, and, since the two arcuate resilient members are designed as separate components, they can be individually replaced in the event of damage, thereby reducing maintenance costs. The partial frictional contact between the two arcuate resilient members 20 and 20B also contributes to increased individual flexibility and longer service life.

Furthermore, the two arcuate resilient members 20 and 20B may have either the same or different material densities. In particular, configuring the two arcuate resilient members 20 and 20B with different material densities allows precise grading of load capacity based on user weight. For example, the two arcuate resilient members 20 and 20B can be classified into three hardness degrees A, B, and C, enabling various combinations such as AA, AB, AC, BB, etc., thereby enhancing the customization of shock absorption effects.

What is claimed is:

1. A shock-absorbing seatpost, comprising: a linkage mechanism, and a resilient assembly, wherein the linkage mechanism includes connecting joints positioned at four corners, defining a variable-sized accommodation chamber;

the resilient assembly consists of two interlocking arcuate resilient members each having a first curved end and a second curved end, with an inwardly curved surface and an outwardly curved surface extending therebetween;

wherein the first curved end of one arcuate resilient member interlocks with the inwardly curved surface of the other arcuate resilient member to form an interlocking configuration, with the two interlocking arcuate resilient members being secured together within the accommodation chamber; and a retention mechanism engaging with the two arcuate resilient members and the accommodation chamber to prevent the arcuate resilient members from disengaging from their accommodated position within the accommodation chamber;

wherein the retention mechanism includes interlocking flanges and grooves, each flange being formed on the outwardly curved surface and extending to the second curved end, and each groove being formed at a corresponding position within the accommodation chamber.

2. The shock-absorbing seatpost according to claim 1, wherein each arcuate resilient member further forms at least one shock-absorbing slot.

3. The shock-absorbing seatpost according to claim 2, wherein the at least one shock-absorbing slot extends through both the inwardly curved surface and the outwardly curved surface.

4. The shock-absorbing seatpost according to claim 2, wherein the inwardly curved surface of the arcuate resilient member further includes an engagement recess corresponding to a complementary engagement protrusion formed on the first curved end of the other arcuate resilient member, and the positions of the engagement recess and the engagement protrusion are aligned with the position of the shock-absorbing slot.

5. The shock-absorbing seatpost according to claim 1, wherein the outwardly curved surface defines two lateral margins, with the flange disposed in the middle partial section between these two lateral margins.

6. The shock-absorbing seatpost according to claim 1, wherein the second curved end of one arcuate resilient member further partially protrudes to form a compression flange which presses against the outwardly curved surface of the other arcuate resilient member.

7. The shock-absorbing seatpost according to claim 1, wherein the two arcuate resilient members have the same material densities.

8. The shock-absorbing seatpost according to claim 1, wherein the two arcuate resilient members have different material densities.

* * * * *